United States Patent [19]

Tatsumi

[11] Patent Number: 5,077,019
[45] Date of Patent: Dec. 31, 1991

[54] POLYMER FORMING DEVICE

[76] Inventor: Michiharu Tatsumi, 4-15, Nishichiyogaoka 1-chome, Nara-shi, Nara, Japan

[21] Appl. No.: 469,182

[22] Filed: Jan. 24, 1990

[30] Foreign Application Priority Data

Aug. 18, 1989 [JP] Japan ............................. 1-213199

[51] Int. Cl.$^5$ ............................................. B01J 19/26
[52] U.S. Cl. ............................ 422/131; 137/625.32; 239/562; 239/579; 422/138
[58] Field of Search ............................... 422/131–138; 137/625.32; 239/562, 579

[56] References Cited

U.S. PATENT DOCUMENTS

| | | | |
|---|---|---|---|
| 2,395,079 | 2/1946 | Sparks et al. | 422/135 |
| 3,237,872 | 3/1966 | Mincy | 239/562 |
| 4,577,661 | 3/1986 | Melrose et al. | 137/625.32 |
| 4,738,283 | 4/1988 | Shirai et al. | 137/625.32 |
| 4,774,984 | 10/1988 | Peters | 137/625.32 |

*Primary Examiner*—Jill Johnston
*Attorney, Agent, or Firm*—Wenderoth, Lind & Ponack

[57] ABSTRACT

A polymer forming assembly, for use in a reactor for carrying out a polymerization reaction, includes a casing mounted on the bottom of the reactor and formed with a polymer discharge channel communicating with the interior of the reactor, a block member secured to the bottom of the casing, and a cylindrical shaft member rotatably mounted in the block member. The cylindrical shaft is formed in its peripheral surface with an axially extending passage and a plurality of polymer outlets opposing and communicating with the passage. The polymer discharge channel in the casing is thus opened and closed by rotating the cylindrical shaft.

6 Claims, 2 Drawing Sheets

5,077,019

POLYMER FORMING DEVICE

BACKGROUND OF THE INVENTION

The present invention relates to a polymer forming device mounted on a discharge port of a reactor in a batch production apparatus of resin polymer.

To produce a polymer for producing a synthetic resin such as polyester and nylon, a device as shown in FIG. 5 is used which comprises a polymerization reactor 1, a die casing 2 connected to the bottom of the reactor 1, a die plate 3 received in the bottom of the die casing 2 and a valve 4 with a jacket for accommodating a heating medium provided at the intermediate portion of the die casing 2.

The die plate 3 is adapted to distribute polymer uniformly and discharge it into the atmosphere after molding it into a stranded or slitted shape or any other desired shape. The valve 4 is adapted to be closed during the polymerization reaction and opened when discharging the polymer is discharged from the reactor 1.

In such a batch type reactor 1, a polymerization reaction takes place discontinuously. Thus, it is necessary to keep a vacuum in the reactor 1 during every reaction step. To maintain a vacuum in the reactor 1, the valve has to be closed.

The valve 4 is provided therearound with a jacket for circulating a heating medium and is movable into and out of the polymer discharge channel in the die casing 2. This will necessarily lead to an increase in the size and the length of the die casing 2. This will in turn increase the amount of polymer left undischarged. Also, it is necessary to increase the discharge pressure because the polymer discharge channel is rather long.

Polymer tends to adhere to a lower portion of the die plate 3 while being discharged. Thus, it is necessary to provide a scraping means to scrape off the adhering polymer after discharging. This will complicate the structure of the whole device.

To maintain a vacuum in the reactor 1, a gasket 5 and a cover 6 have to be bolted to the bottom of the die plate 3 as shown in FIG. 5 immediately after hot polymer has been discharged, with remaining hot polymer dripping. Such work not only involves danger but also has to be done under very bad conditions. The working efficiency is equally bad. Thus there has been a long-felt need to improve such working conditions.

SUMMARY OF THE INVENTION

It is an object of the present invention to provide a polymer forming device which obviates the above said shortcomings, which has a simple structure and a small number of parts, which has a short polymer discharge channel and which can maintain a perfect vacuum in the reactor.

In accordance with the present invention, there is provided a polymer forming assembly for use with a reactor for polymerization, the polymer forming assembly comprising a casing mounted on the bottom of the reactor and formed with a polymer discharge channel communicating with the interior of the reactor, a block member secured to the bottom of the casing, and a cylindrical shaft member rotatably mounted in the block member, the cylindrical shaft member being formed in the peripheral surface thereof with a passage extending longitudinally of the shaft member and with a plurality of polymer outlets arranged longitudinally of the shaft member and communicating with the passage, whereby the polymer discharge channel in the casing is opened and closed by rotating the cylindrical shaft member.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENT

Figure 1:
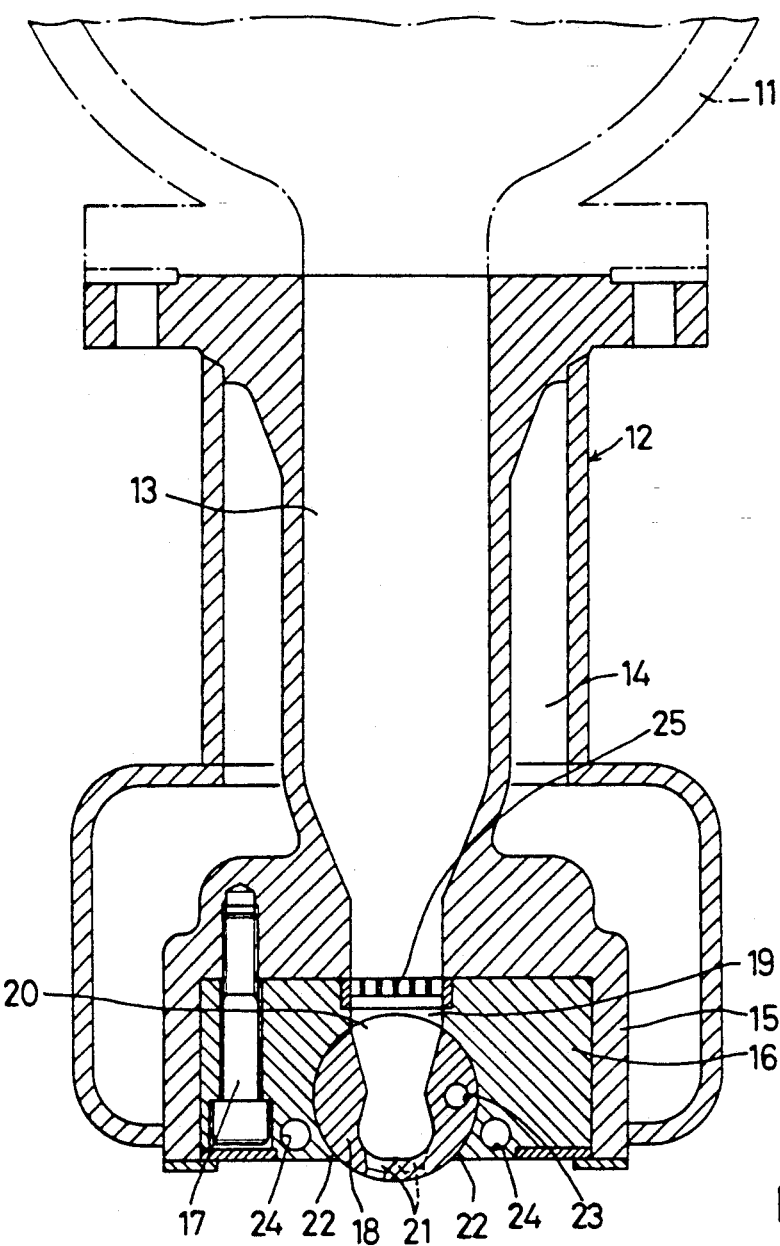
FIG. 1 is a vertical sectional view of the first embodiment of the present invention.
Figure 2:
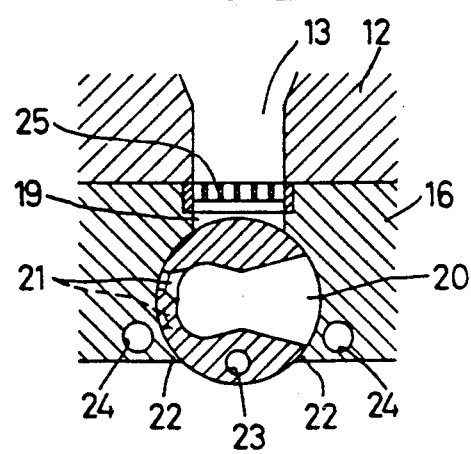
FIG. 2 is a similar view of the cylindrical shaft member of the same in the closed position.

Now referring to FIGS. 1 and 2, a die casing 12 connected to the bottom of a reactor 11 is formed with a polymer discharge channel 13 extending vertically therethrough. A jacket 14 for accommodating a heating medium is provided around the die casing 12.

The casing 12 is integrally provided at its bottom with a large-diameter portion 15 in which a block member 16 is fixedly mounted by means of a bolt 17. In the block member 16, a horizontally extending cylindrical shaft member 18 is rotatably mounted.

The block member 16 communicates with the polymer discharge channel 13 through a passage 19 in which a distributer 25 is mounted. The cylindrical shaft member 18 is mounted so that its lower portion will protrude from the bottom face of the block member 16. Also it is formed in the outer periphery thereof with a longitudinally extending passage 20 and with a plurality of polymer outlets or slits 21 spaced in in the longitudinal direction of the shaft member and located so as to diametrically oppose and communicate with the passage 20.

When the cylindrical shaft member 18 is in the position shown in FIG. 1 where the passage 20 communicates with the passage 19, the polymer outlets 21 protrude from the bottom of the block member 16 and are open to the atmosphere, so that the polymer can be discharged.

Figure 5:
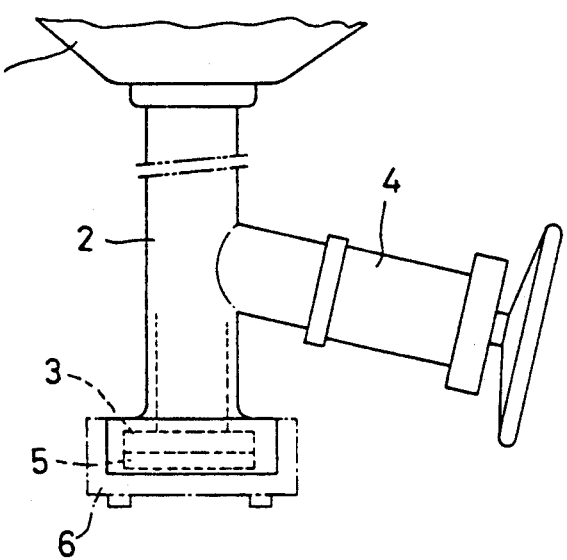
FIG. 5 is a front view of a prior art polymer forming device.

When the cylindrical shaft 18 is turned by 90 degrees from the position shown in FIG. 5, the passage 20 will be disconnected from the passage 19 and the polymer outlets 21 will be closed by the inner peripheral surface of the block member 16, thus preventing the polymer from being discharged.

the block member 16 is formed at tis bottom portion along both sides of the cylindrical shaft member 18 with lips 22 to scrape off polymer. The lips 22 also serve to form a polymer seal between the inner surface or tip of the lips 22 and the outer periphery of the cylindrical shaft member 18 when the polymer cools down and hardens.

The cylindrical shaft 18 is formed with an axially extending channel 23. Air, inactive gas or liquid is fed from outside the jacket 14 into the channel 23 and circulates therethrough so as to cool down the cylindrical shaft 18.

The block member 16 is formed at both sides of the cylindrical shaft 18 with passages 24 for allowing a heating medium to pass therethrough or for mounting heating means to melt the solidified polymer swiftly.

The cylindrical shaft 18 should be rotated by means of an air or hydraulic cylinder or a motor such as an electric motor.

The block member 16 and the cylindrical shaft 18 may be made of a stainless steel of any kind, a corrosion-resistant sintered alloy, a corrosion-resistant aluminum alloy, a ceramic, a heat-resistant special resin or a combination thereof. The surface of the cylindrical shaft 18 may be hardened by spraying or welding a stellite or a special alloy steel thereon, by applying a coating of a ceramic or a special heat-resistant resin, thereon, by plating an appropriate metal thereon or by subjecting the shaft to a metal diffusion treatment.

To discharge the polymer, the cylindrical shaft 18 is turned to the open position shown in FIG. 1.

No refrigerant is fed into the passage 23 in the cylindrical shaft 18 in this state.

After discharging polymer, the cylindrical shaft 18 is turned by 90° degrees to its disclosed shown in FIG. 2 to close the polymer discharge channel 13. Then the next polymer production begins in the reactor 11.

The cylindrical shaft 18 and the block member 16 are in contact with each other to form the sealing portion. In this state, a refrigerant is fed into the passage 23 so as to circulate therethrough.

The cylindrical shaft 18 will become covered with a thin film of molten polymer. It is adapted to harden at the sealing portion as the temperature is reduced by the circulation of refrigerant. The thus hardened polymer will serve to air tightly seal the sealing portion and maintain a vacuum in the reactor 11.

In this state, the material for the next step will be polymerized by heating the under material vacuum in the reactor 11.

To discharge the polymer thus produced, a heating medium such as hot air or warm water is supplied into the channels 24, or the cylindrical shaft 18 is heated by a separate electric heater to raise its temperature and thus melt the hardened polymer covering the sealing portion. Then the cylindrical shaft 18 is turned by 90 degrees from the closed position shown in FIG. 2 to the open position shown in FIG. 1.

Figure 3:
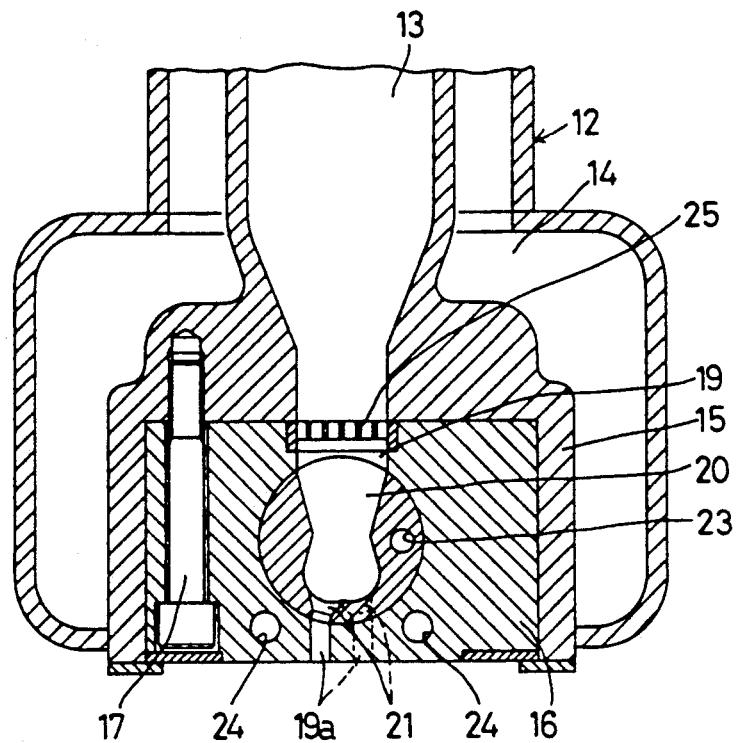
FIG. 3 is a similar view of a second embodiment.
Figure 4:
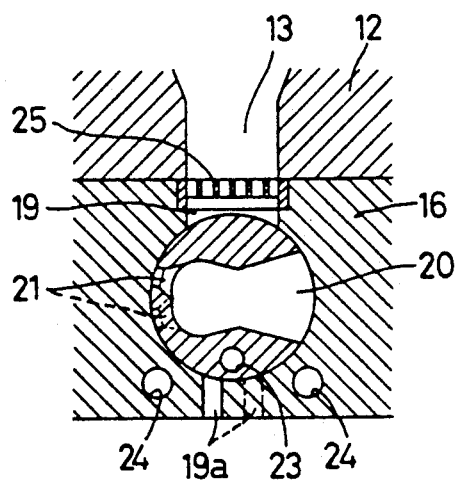
FIG. 4 is a similar view of the cylindrical shaft member of the same in the closed position.

FIGS. 3 and 4 show the second embodiment in which like parts are represented by like numerals.

In this embodiment, the cylindrical shaft 18 is completely disposed within the block member 16, which is formed with channels 19a having their top ends in communication with the polymer outlets 21 and their bottom ends exposed to the atmosphere.

Polymer is adapted to harden between the outer periphery of the cylindrical shaft 18 and the inner surface of the block member 16 to form a polymer seal.

A thermosensor may be used in either of the embodiments to cool and heat the cylindrical shaft 18 and the block member 16 by remote control Also, a lid for facilitating cleaning may be put on the bottom of the block member 16 to forcibly circulate a cleaning liquid int he block member 16, the cylindrical shaft 18 and the reactor 11 to clean the interior thereof.

According to the present invention, the number of parts can be reduced to a minimum and thus the device is light and compact and its maintenance is easy. Polymer can be discharged through a substantially straight channel. Also the device according to the present invention is easy to clean as well as to assemble and disassemble.

The interior of the reactor can be reliably kept under a vacuum. This makes it possible to produce a high-quality polymer in the reactor.

What is claimed is:

1. A polymer forming assembly for use in a reactor for carrying out a polymerization reaction, the polymer forming assembly comprising: a casing defining a polymer discharge channel therethrough; a block member secured to the bottom of said casing; a valve member including a cylindrical shaft rotatably mounted in said block member; said cylindrical shaft defining in the peripheral surface thereof both a passage extending longitudinally thereof and a plurality of polymer outlets spaced in the longitudinal direction thereof and communicating with said passage, the polymer discharge channel in said casing being opened and closed by the rotation of the cylindrical shaft of said valve member; and means for facilitating both the heating and the cooling of the cylindrical shaft of said valve member.

2. A polymer forming assembly as claimed in claim 1, wherein said means for facilitating includes a channel extending through the shaft of said valve member for allowing refrigerant to flow through said shaft, and a passage extending through said block member adjacent the periphery of said shaft for allowing a heating medium to pass therethrough.

3. A polymer forming assembly as claimed in claim 2, wherein said means for facilitating further includes a jacket surrounding said casing and having a portion thereof spaced form said casing so as to define a space therebetween for accommodating refrigerant, said space communicating with the channel extending through said shaft.

4. The combination of a reactor for carrying out a polymerization reaction, and a polymer forming assembly, the polymer forming assembly comprising a casing mounted on the bottom of said reactor and defining a polymer discharge channel therethrough communicating with the interior of said reactor, a block member secured to the bottom of said casing, a valve member including a cylindrical shaft rotatably mounted in said block member, said cylindrical shaft defining int he peripheral surface thereof both a passage extending longitudinally thereof, and a plurality of polymer outlets spaced in the longitudinal direction thereof and communicating with said passage, the polymer discharge channel in said casing being opened and closed by the rotation of the cylindrical shaft of said valve member, and means for facilitating both the heating and the cooling of the cylindrical shaft of said valve member.

5. The combination of a reactor and polymer forming assembly as claimed in claim 4, wherein said means for facilitating includes a channel extending through the shaft of said valve member for allowing refrigerant to flow through said shaft, and a passage extending through said block member adjacent the periphery of said shaft for allowing a heating medium to pass therethrough.

6. The combination of a reactor and polymer forming assembly as claimed in claim 4, wherein said means for facilitating further includes a jacket surrounding said casing and having a portion thereof spaced form said casing so as to define a space therebetween for accommodating refrigerant, said space communicating with the channel extending through said shaft.

* * * * *